2,969,363

Patented Jan. 24, 1961

United States Patent Office

2,969,363
NOVEL SALTS OF BARBITURIC ACIDS AND METHOD OF PREPARING SAME

Albert Schlesinger, Jackson Heights, and Samuel M. Gordon, Forest Hills, N.Y., assignors to Endo Laboratories, Inc., Richmond Hill, N.Y., a corporation of New York No Drawing. Filed May 23, 1957, Ser. No. 661,049

5 Claims. (Cl. 260—253)

This invention relates to novel salts of barbituric acids. More particularly it is directed to salts of barbituric acid with 7-dimethyl-amino ethyl theophylline; and method of preparing same.

In pending application Serial No. 258,746, filed November 28, 1951, there is shown the preparation of 7-dimethylamino ethyl theophylline; and that this compound distinguishes itself from all other known xanthine derivatives by a strong stimulating action on the central nervous system but with absence of any psychomotor activity.

With the application of barbiturates as hypnotics, certain unwelcome phenomena have to be considered, such as respiratory depression, prolongation of depression, stupor, coma and even collapse.

It has now been found that improved and safer barbituric acid salts are obtained when barbituric acids are combined with 7-dimethylamino ethyl theophylline. It has been further found, since the 7-dimethylamino-ethyl theophylline is a strong base, that the salts of this base with barbituric acids can be obtained in well-defined crystalline form. The resulting novel salts show by their chemical analysis, that one molecule of 7-dimethyl-amino-ethyl theophylline joins with one molecule of the corresponding barbituric acid.

In carrying out the present invention there may be used barbituric acids, having hypnotic effects, such as for example:

5,5-diethyl barbituric acid (Barbital)
5-ethyl-5-phenyl-barbituric acid (Phenobarbital)
5-allyl-5-allyl-barbituric acid (Allobarbital)
5-ethyl-5-isoamyl-barbituric acid (Amobarbital)
5-ethyl-5-(L-methyl butyl)-barbituric acid (Penobarbital)
5-(1-cyclohexen-1-yl)-1,5-dimethyl barbituric acid (Hexobarbital)
5-allyl-5-(1-methylbutyl)-barbituric acid (Seconal)
5-ethyl-5-sec-butyl-barbituric acid (Butabarbital)
5-ethyl-5-(1-cyclohepten-1-yl) barbituric acid (Heptabarbital)
5-ethyl-5-phenyl-1-methyl barbituric acid (Mephobarbital)
5-allyl-5(1-methyl butyl)-2-thiobarbituric acid (Thiamylal)
5-ethyl-5-(1-methylbutyl)-2-thiobarbituric acid (Thiopental)

Biological tests of the new salts have shown that the side effects of the barbiturates, as respiratory depression or prolongation of depression, are to a large extent eliminated. It was also found that the general toxicity of the barbituric acids in form of the new salts is decreased.

Accordingly this discovery is important and useful in the administration of bartiburates so as to ameliorate, prevent or counteract the dangerous effects which may be produced by the administration of the barbiturates alone.

The following are examples in accordance with this invention:

Example 1

9.2 grams of 5,5-diethyl-barbituric acid and 13 grams of 7-dimethylamino ethyl theophylline in 150 cc. of benzene are refluxed, until a clear solution is obtained. To the hot, filtered solution there are added 100 cc. of hexane. The clear solution is allowed to cool to 25° C. It is then cooled in the ice-box for 24 hours. The crystalline product is filtered, washed twice with hexane and dried in a desiccator. Its melting point is 95° C.

Chemical analysis thereof shows that one molecule of the 5,5-diethylbarbituric acid joins with one molecule of 7-dimethylamino ethyl theophylline.

Example 2

11.3 grams of 5-ethyl-5-isoamyl-barbituric-acid and 13 grams of 7-dimethylamino ethyl theophylline in 100 cc. of ether are refluxed, until complete solution is reached. To the filtered solution there are added 100 cc. of hexane. The clear solution is allowed to cool to 25° C. After crystallization starts, 100 cc. more of hexane are added, and then cooled overnight in the ice-box.

The crystalline salt is filtered, washed twice with hexane, and dried in the desiccator. The melting point thereof is 90° C.

In a sample of 626.2 mg. of this salt there were assayed 292.7 mg. of 5-ethyl-5-isoamyl barbituric acid (theoretical: 296.7 mg.).

Example 3

11.6 grams of 5-ethyl-5-phenyl-barbituric acid and 13 grams of 7-dimethylamino ethyl theophylline in 250 cc. of benzene were refluxed until a clear solution was obtained. The hot solution was filtered, and then allowed to cool to 10–15° C. The crystalline salt was filtered, washed twice with cold benzene and dried in a desiccator. The melting point was 147° C.

Example 4

11.3 grams of 5-ethyl-5-(1-methyl butyl)-barbituric acid and 13 grams of 7-dimethylamino ethyl theophylline in 100 cc. ether were refluxed until a clear solution was obtained. The filtered solution was allowed to cool to 25° C., and pentane was added until turbidity was reached. Soon crystallization started. The crystalline salt was filtered, washed with pentane and dried in a desiccator. Its melting point is 103.5° C.

Example 5

4.7 grams of 5-(1-cyclohexen-1-yl)-1,5-dimethyl barbituric acid and 5.2 grams of 7-dimethyl amino ethyl theophylline in 100 cc. ether were refluxed until a clear solution was obtained; and then filtered. After cooling to 25° C., 100 cc. of pentane were added, and cooled overnight in the ice-box. The new crystalline salt was filtered, washed with pentane and dried in a desiccator. Its melting point is 91° C.

Example 6

4.16 grams of 5-allyl-5-allyl barbituric acid and 5.2 grams of 7-dimethylamino ethyl theophylline in 50 cc. of benzene where refluxed until a clear solution was obtained, and then filtered. 100 cc. of hexane were added, and the solution cooled in the ice-box. The crystalline salt was filtered, washed with hexene, and dried in a desiccator. Its melting point is 100° C.

Example 7

4.76 grams of 5-allyl-5-(1-methyl butyl)-barbituric acid and 5.2 grams of 7-dimethylamino ethyl theophylline in 100 cc. ether were refluxed until complete solution occurred. The filtered solution was cooled in the ice-box overnight, then 100 cc. pentane were added, stirred and cooled again for 12 hours in the ice-box. The new crystalline salt was filtered, washed with pentane and dried in a desiccator. Its melting point is 105° C.

*Example 8*

2.5 grams of 5-ethyl-5(1-methyl butyl)-2-thiobarbituric acid (M.P. 159° C.) and 2.5 grams of 7-dimethyl-amino-ethyl theophylline (M.P. 107° C.) in 50 cc. ether are refluxed until a clear solution results. The solution is the filtered and cooled in a refrigerator for 16 hours. The precipitated crystalline salt is filtered on a Buchner funnel, and dried.

The resulting new compound melts at 103° C.

The filtrate is evaporated at room temperature under reduced pressure and an additional crop of the new compound is obtained, M.P. 103° C.

While this invention has been described in connection with certain preferred embodiments of the same, it is not limited to the specific details disclosed and maybe carried out in the various additions, substitutions and modifications, without departing from the scope of the invention as defined in the appended claims.

What is claimed is:

1. Salts of 7-dimethyl amino ethyl theophylline with a barbituric acid whereof position 1 is occupied by a member of the group consisting of hydrogen and lower alkyl, one of the positions 5 is occupied by lower alkyl, and the second of positions 5 is occupied by a member of the group consisting of phenyl, mono-nuclear cycloalkenyl, lower alkyl and lower alkenyl.

2. The 7-dimethyl amino ethyl theophylline salt of 5-ethyl-5-phenyl-barbituric acid.

3. The 7-dimethyl amino ethyl theophylline salt of 5-(1-cyclohexen-1-yl)-1,5-dimethyl barbituric acid.

4. The 7-dimethyl amino ethyl theophylline salt of 5-allyl-5-(1-methyl butyl)-barbituric acid.

5. The 7-dimethyl amino ethyl theophylline salt of 5-ethyl-5(1-methylbutyl)-2-thiobarbituric acid.

References Cited in the file of this patent

UNITED STATES PATENTS

| | | |
|---|---|---|
| 2,017,279 | Gruter | Oct. 15, 1935 |
| 2,641,598 | Moussalli et al. | June 9, 1953 |

OTHER REFERENCES

Higgins et al.: Jour. Amer. Pharm. Assoc., vol. 33, pp. 310–314 (1944).

Dunker: Jour. Amer. Pharm. Assoc., vol. 39, pp. 311–312 (1950).